United States Patent
Zheng et al.

(10) Patent No.: US 9,756,371 B2
(45) Date of Patent: Sep. 5, 2017

(54) AUTHORIZATION METHOD AND SYSTEM FOR SMART TV AND SMART TV APPLYING THE SAME

(71) Applicant: MStar Semiconductor, Inc., Hsinchu Hsien (TW)

(72) Inventors: Renzhen Zheng, Shenzhen (CN); Xiaoyu Yang, Shenzhen (CN); Jie-Wu Chen, Shenzhen (CN)

(73) Assignee: MSTAR SEMICONDUCTOR, INC., Hsinchu Hsien (TW)

( * ) Notice: Subject to any disclaimer, the term of this patent is extended or adjusted under 35 U.S.C. 154(b) by 260 days.

(21) Appl. No.: 13/904,113

(22) Filed: May 29, 2013

(65) Prior Publication Data

US 2014/0026161 A1  Jan. 23, 2014

(30) Foreign Application Priority Data

Jul. 17, 2012 (CN) .......................... 2012 1 0247355

(51) Int. Cl.
| | |
|---|---|
| *H04N 21/435* | (2011.01) |
| *H04N 21/4627* | (2011.01) |
| *H04N 21/258* | (2011.01) |
| *H04L 29/06* | (2006.01) |

(52) U.S. Cl.
CPC . *H04N 21/25816* (2013.01); *H04N 21/25875* (2013.01); *H04N 21/435* (2013.01); *H04N 21/4627* (2013.01); *H04L 63/0823* (2013.01)

(58) Field of Classification Search
CPC ........... H04N 21/258; H04N 21/25816; H04N 21/25875; H04N 21/435; H04N 21/4627

USPC ....................................................... 725/29–31
See application file for complete search history.

(56) References Cited

U.S. PATENT DOCUMENTS

| | | | | |
|---|---|---|---|---|
| 6,463,534 | B1 * | 10/2002 | Geiger .................... | G06F 21/10 380/278 |
| 6,513,117 | B2 * | 1/2003 | Tarpenning ............. | G06F 21/10 380/252 |
| 6,748,080 | B2 * | 6/2004 | Russ ................... | H04L 12/2805 348/E5.004 |
| 6,763,459 | B1 * | 7/2004 | Corella ................... | H04L 9/006 713/156 |
| 7,340,600 | B1 * | 3/2008 | Corella ............... | H04L 63/0823 713/155 |
| 7,707,405 | B1 * | 4/2010 | Gilman ................... | G06F 21/33 713/156 |
| 8,364,952 | B2 * | 1/2013 | Ho ........................ | H04L 9/0891 380/277 |
| 8,392,702 | B2 * | 3/2013 | Qiu ..................... | H04L 63/0442 380/277 |
| 8,555,079 | B2 * | 10/2013 | Shablygin ............... | G06F 21/34 713/185 |
| 8,619,982 | B2 * | 12/2013 | Sitrick .................... | G06F 21/10 380/200 |

(Continued)

*Primary Examiner* — Nathan Flynn
*Assistant Examiner* — Tung T Trinh
(74) *Attorney, Agent, or Firm* — WPAT, PC

(57) ABSTRACT

An authorization method for a smart TV is provided. When an application is to be activated, it is determined whether machine authorization information is stored. When the machine authorization information is stored, a client certificate corresponding to the application is searched for. When the client certificate is found, it means the application is authorized. The application authorized by a server can then be activated.

2 Claims, 5 Drawing Sheets

(56) References Cited

U.S. PATENT DOCUMENTS

| | | | |
|---|---|---|---|
| 9,542,713 B2* | 1/2017 | StJohns | H04L 9/3268 |
| 2002/0027992 A1* | 3/2002 | Matsuyama | G06F 21/10 |
| | | | 380/231 |
| 2002/0184508 A1* | 12/2002 | Bialick | G06F 21/10 |
| | | | 713/182 |
| 2003/0099252 A1* | 5/2003 | Master | G06F 21/10 |
| | | | 370/437 |
| 2003/0115466 A1* | 6/2003 | Aull | G06Q 20/341 |
| | | | 713/172 |
| 2003/0191936 A1* | 10/2003 | Kawatsura | H04L 63/123 |
| | | | 713/156 |
| 2004/0006697 A1* | 1/2004 | Noyama | H04L 9/32 |
| | | | 713/182 |
| 2004/0103324 A1* | 5/2004 | Band | G06F 21/31 |
| | | | 726/9 |
| 2005/0005286 A1* | 1/2005 | Koskela | G06F 21/121 |
| | | | 725/31 |
| 2006/0005253 A1* | 1/2006 | Goldshlag | H04N 7/173 |
| | | | 726/26 |
| 2006/0074807 A1* | 4/2006 | Gauba | G11B 27/105 |
| | | | 705/51 |
| 2006/0085634 A1* | 4/2006 | Jain | G06F 21/10 |
| | | | 713/156 |
| 2006/0269061 A1* | 11/2006 | Balasubramanian | C07D 209/88 |
| | | | 380/247 |
| 2007/0086589 A1* | 4/2007 | Park | H04N 7/163 |
| | | | 380/201 |
| 2007/0226150 A1* | 9/2007 | Pietrzak | G06Q 30/02 |
| | | | 705/59 |
| 2008/0147227 A1* | 6/2008 | Delaney | G06Q 10/08 |
| | | | 700/115 |
| 2012/0079272 A1* | 3/2012 | Tolle | G06F 3/04847 |
| | | | 713/168 |
| 2012/0167185 A1* | 6/2012 | Menezes | H04L 9/3213 |
| | | | 726/5 |
| 2012/0278618 A1* | 11/2012 | Roberts, Jr. | H04L 9/3271 |
| | | | 713/168 |
| 2013/0139241 A1* | 5/2013 | Leeder | H04W 12/06 |
| | | | 726/9 |
| 2013/0185552 A1* | 7/2013 | Steer | H04N 21/25816 |
| | | | 713/156 |

* cited by examiner

AUTHORIZATION METHOD AND SYSTEM FOR SMART TV AND SMART TV APPLYING THE SAME

This application claims the benefit of People's Republic of China application Serial No. 201210247355.1, filed on Jul. 17, 2012, the subject matter of which is incorporated herein by reference.

BACKGROUND OF THE INVENTION

Field of the Invention

The invention relates in general to a digital television field, and more particularly to an authorization method and system for a smart TV and a smart TV applying the same.

Description of the Related Art

As techniques of computer chips and the Internet prosper at an overwhelmingly fast pace, smart TVs have become a new market focus. In addition to receiving conventional television programs, a smart TV equipped with a high-performance processor and a broadband Internet interface can also be built-in or be installed with various applications. Although smart TVs and computers may appear homogenized, distinctions still exist between the two. First of all, a smart TV principally serves functions as a television, and is based on authorization requirements of conditional access similar to those of a digital television. That is, only clients that are authorized by manufacturers and service providers have access to services, and illegal clients and delinquent clients may be suspended from the services. Further, a smart TV, demanding higher system stability than that of a computer, forbids clients from installing arbitrary applications but only allows applications that are authorized by manufacturers, and is thus a more closed environment compared to a computer. Moreover, one manufacturer may have several different application providers. In order to guarantee the welfare of the application providers, authorization control is needed for all applications to ensure that only authorized applications can be downloaded and installed to a smart TV as well as being provided to only authorized clients.

A systematic or standardized authorization mechanism applied in smart TVs is currently market-unavailable. A license file cured in a television when manufacturing the television is a common authorization method adopted by many manufacturers. However, different authorization files need to be properly managed for each of a vast number of televisions during the manufacturing process, such that complications to the manufacturing process and lower manufacturing efficiency may be resulted. Further, the cured license file cannot be modified and is easily acquired for illegal use.

SUMMARY OF THE INVENTION

The invention is directed to an authorization method and system for a smart TV and a smart TV applying the same, which form a standardized authorization system by combining machine authorization and application authorization of the smart TV.

According to an embodiment of the disclosure, an authorization method for a smart TV is provided. The authorization method includes steps of: when an application is to be activated, the smart TV determining whether machine authorization information is stored in the smart TV; when the machine authorization information is stored, the smart TV searching for a client certificate corresponding to the application, wherein the client certificate includes a validity expiration date; reading the client certificate when the client certificate is found; and determining whether the client certificate is valid according to the validity expiration date, and activating the application when the client certificate is valid.

According to another embodiment of the disclosure, a smart TV is provided. The smart TV includes: a first determination module, for determining whether machine authorization information is stored in the smart TV when an application is to be activated; a search module, for searching in the TV for a client certificate corresponding to the application when the machine authorization information is stored, wherein the client certificate includes a validity expiration date; a reading module, for reading the client certificate when the client certificate is found; and a second determination module, for determining whether the client certificate is valid according to the validity expiration date; and an activation module, for activating the application when the client certificate is valid.

According to another embodiment of the disclosure, an authorization system for a smart TV is provided. The authorization system includes a smart TV and a server. The smart TV determines whether machine authorization information is stored in the smart TV when an application is to be activated, and searches for a client certificate corresponding to the application when the machine authorization information is stored. The client certificate includes a validity expiration date. When the client certificate is found, the smart TV reads the client certificate and determines whether the client certificate is valid according to the validity expiration date. The smart TV activates the application when the client certificate is valid. When the machine authorization information is unavailable, the smart TV transmits a machine authorization request message to the server, wherein the machine authorization request message includes a unique hardware identification of a device and manufacturer information of the device. The smart TV receives machine authorization information replied from the server in response to the unique hardware identification of the device and the manufacturer information of the device. The server receives a machine authorization request message transmitted from the smart TV, and determines whether the unique hardware identification of the device exists in a hardware identification database corresponding to the manufacture information of the device. Machine authorization information is replied to the smart TV when the unique hardware identification of the device exists in the hardware identification database, or else an authorization failure message is replied to the smart TV when the unique hardware identification of the device does not exist.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1:
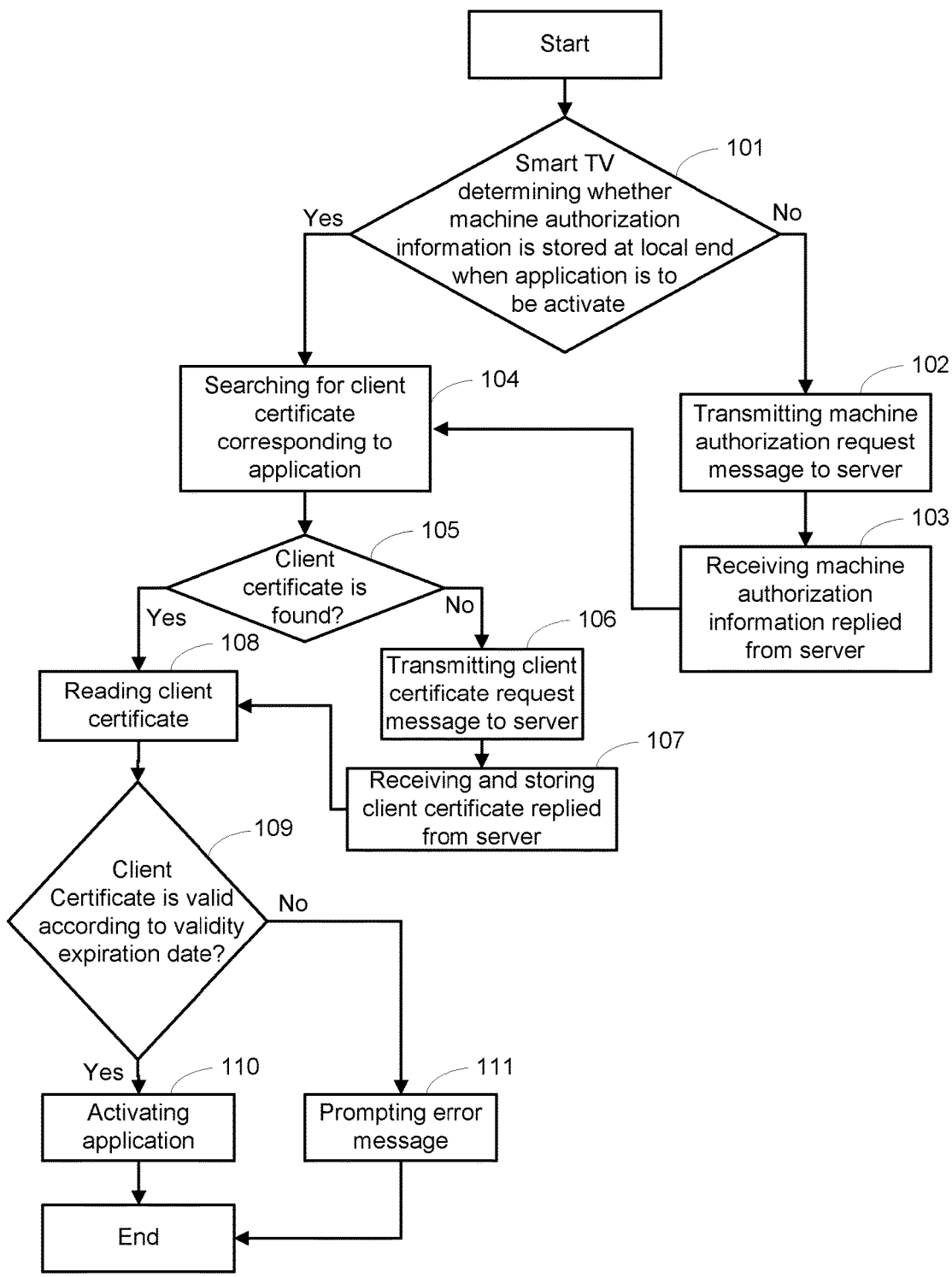
FIG. 1 is a flowchart of an authorization method for a smart TV at a smart TV end according to one embodiment of the disclosure.
Figure 2:
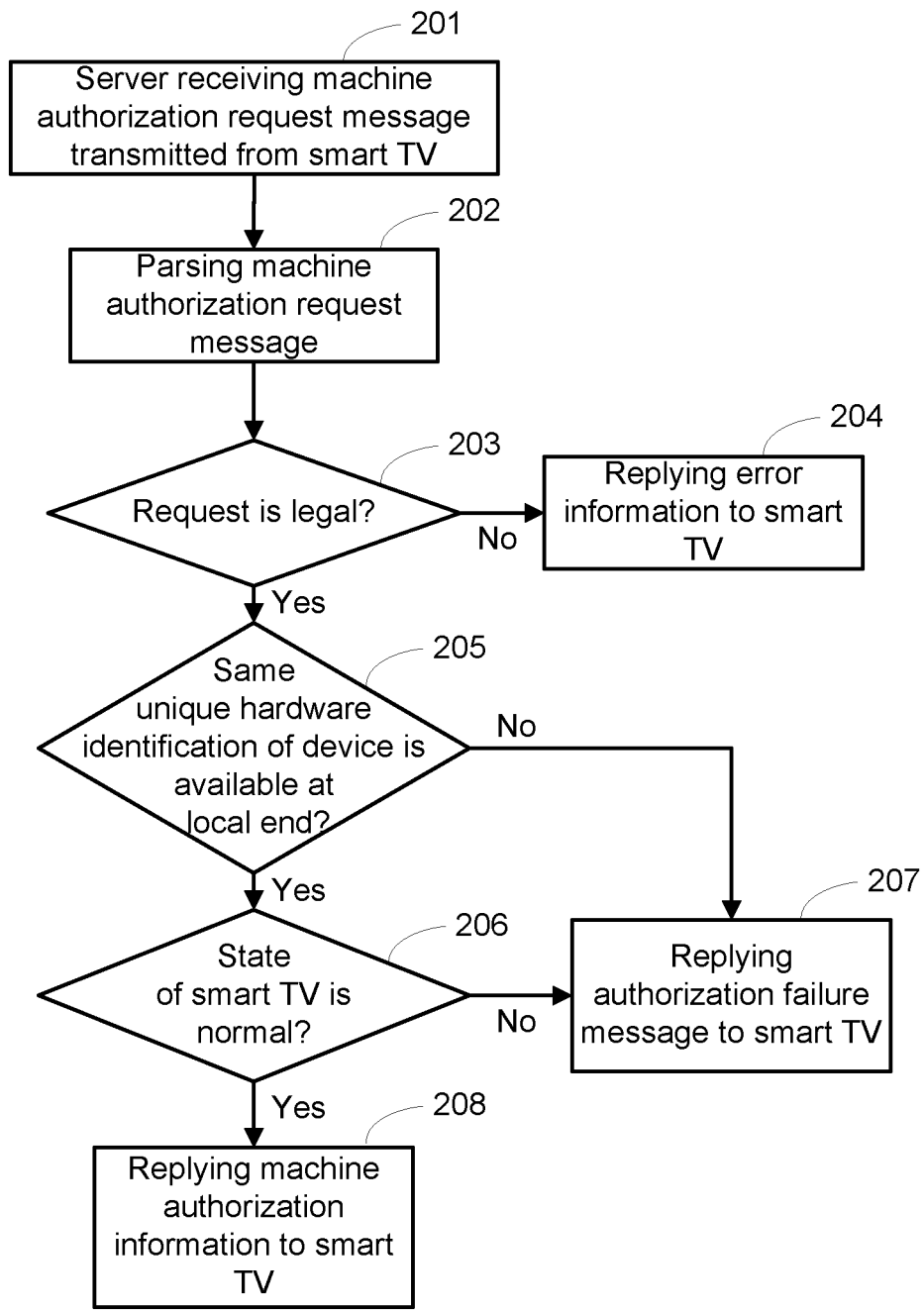
FIG. 2 is a flowchart of an authorization method for a smart TV at a server end according to one embodiment of the disclosure.
Figure 3:
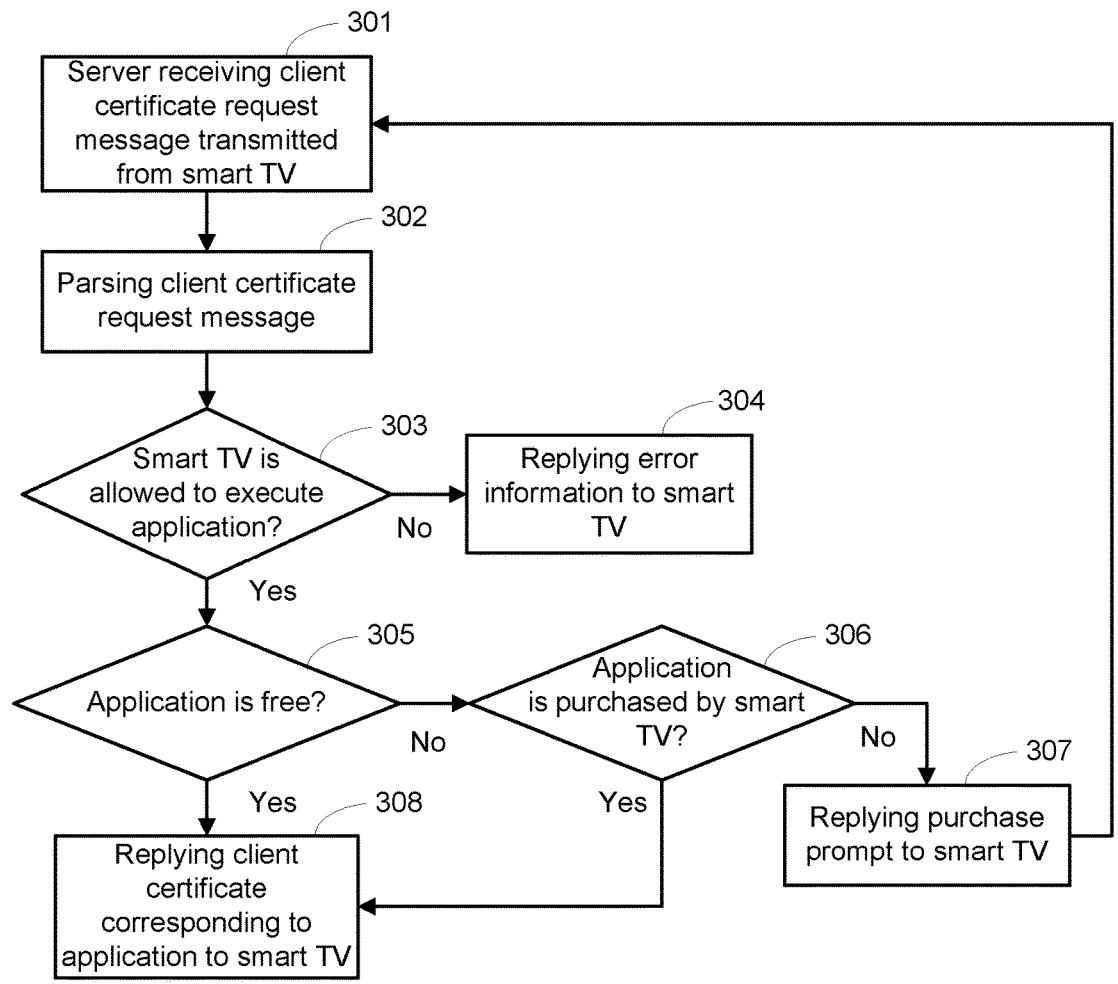
FIG. 3 is a flowchart of an authorization method for a smart TV at a server end according to another embodiment of the disclosure.

Referring to FIGS. 1 to 3, an authorization method for a smart TV according to one embodiment of the disclosure includes the following steps.

FIG. 1 shows an authorization method for a smart TV at a smart TV end according to one embodiment. In Step 101, when an application is to be activated, it is determined whether machine authorization information is stored at a local end. To activate the application, it is necessary that the smart TV be authorized, and machine authorization information is stored at a designated address at the local end in the authorized smart TV. Therefore, when the foregoing application is to be activated, the smart TV first determines whether the machine authorization information is stored at the local end.

In Step 102, a machine authorization request message is transmitted to a server. When the application is to be activated but the machine authorization information is not stored in the designated address at the local end of the smart TV, it is necessary to apply for machine authorization from the server. For example, the authorization request information includes a unique hardware identification of a device of the smart TV, manufacturer information of the device, machine module number and feature information of the device, and a machine code generated according to a predetermined encryption algorithm. The above data is submitted according to an Advanced Encryption Standard (AES) process to the server via a POST request of HTTP. In the POST request message body, a self-defined request header stores information including signature information, timestamp information, AES key seeds and a protocol version number of the request message body.

In Step 103, the machine authorization information replied from the server is received. Details of the smart TV receiving the machine authorization information replied from the server areas described below. After the smart TV receives an HTTP response, the smart TV performs different processes according to different information received. When the authorization failure message is replied from the server, previously obtained machine authorization information is cleared if the smart TV is authorized but in an abnormal state such as a downtime state, or else an unauthorized prompt is returned to the client of the smart TV if the smart TV is unauthorized. When the machine authorization information is replied from the server, the machine authorization information and a Message-Digest Algorithm 5 (MD5) abstract key are decrypted according to a key of the current request, contents of the machine authorization information are analyzed, and an authorization number carried in the machine authorization information is recorded at the local end.

In Step 104, a client certificate corresponding to the application is searched for. When the machine authorization information stored at the local end is found, it means that the device is authorized and the client certificate corresponding to the application to be activated is searched for.

In Step 105, it is determined whether the client certificate is found. After determining whether the client certificate is found, Step 108 is performed when the client certificate corresponding to the application is stored at the local end, or else Step 106 is performed when the client certificate is not stored at the local end.

In Step 106, a client certificate request message is transmitted to the server. When it is determined that the client certificate corresponding to the application is stored at the local end, the smart TV transmits a request for applying for the client certificate to the server. That is, the smart TV transmits a client certificate request message to the server according to a POST method of the HTTP protocols. The client certificate request message includes data such as an authorization number of the device issued by machine authorization, a unique identification of the application, and a machine model number and feature information of the device, and the above data is then signed.

In Step 107, the client certificate replied from the server is received and stored. The smart TV receives and stores the client certificate after the client certificate corresponding to the application is replied from the server.

In Step 108, the client certificate is read. When the client certificate corresponding to the application is found, or the client certificate corresponding to the application is obtained from the server, the client certificate is read from the address storing the client certificate.

In Step 109, it is determined whether the client certificate is valid according to a validity expiration date. According to the validity expiration date in the client certificate, it is determined whether the client certificate is valid. Step 110 is performed when the client certificate is valid, or else Step 111 is performed when the validity expiration date of the client certificate is expired.

In Step 110, the application is activated. When the client certificate corresponding to the application is still valid, the application is activated.

In Step 111, an error message is prompted. When the client certificate corresponding to the application is expired, an error message is prompted, and the process ends.

FIG. 2 shows a flowchart of an authorization method at a server end after the server receives a machine authorization request message transmitted from a smart TV according to an embodiment.

In Step 201, the server receives the machine authorization request message transmitted from the smart TV.

In Step 202, the machine authorization request message is parsed. After receiving the machine authorization request message transmitted from the smart TV, the server defines a seed of an AES key carried in a header according to the header of the machine authorization request message, restores the AES encryption key according to algorithms regulated by the protocol version number, and decrypts and signs the data. The decrypted data includes the unique hardware identification of the device, the manufacturer information of the device, and the machine model number and feature information of the device.

In Step 203, it is determined whether the request is legal. When required information can be obtained after the server parses the machine authorization request message, it means that the request is legal and Step 205 is performed. When the required information cannot be obtained or error information is obtained after the server parses the machine authorization request message, it means that the request is illegal, and Step 204 is performed.

In Step 204, request error information is replied to the smart TV. When it is determined in Step 203 that the request from the smart TV is illegal, the server replies the request error information to the smart TV.

In Step 205, it is determined whether a matching unique hardware identification of the device is present at the local end. When it is determined in step 203 that the request from the smart TV is legal, it is then determined whether the matching unique hardware identification of the device is present at the local end of the server. More specifically, a corresponding hardware identification table is provided according to the manufacturer information of the device. The hardware identification table records all unique hardware identifications of devices of smart TVs provided by the manufacturer. According to the unique hardware identification of the device parsed from the machine authorization request message, it is determined whether the same unique hardware identification of the device can be identified from the hardware identification table. Step 206 is performed when the same unique hardware identification of the device is found. Else, when the same unique hardware identification of the device is not found in the hardware identification table, it means that the unique hardware identification of the device of the smart TV is fraudulent, and the manufacturer does not manufacture the smart TV corresponding to the fraudulent unique hardware identification of the device, and Step 207 is performed.

To ensure authorization security and to prevent illegal acquisition of registration information such as the manufacturer information of the device and the unique hardware identification of the device, after finding the same unique hardware identification of the device from the hardware identification table, the machine model number and feature information of the device obtained from parsing the machine authorization request message is compared with the machine model number and feature information of the device corresponding to the unique hardware identification of the device stored at the local end of the server. When the machine model number and feature information of the device obtained from parsing the machine authorization request message and the machine model number and feature information of the device corresponding to the unique hardware identification of the device stored at the local end are different, it means that the unique hardware identification of the device of the smart TV is fraudulent and the manufacturer does not manufacture the smart TV corresponding to the fraudulent unique hardware identification of the device, and Step 207 is performed.

In Step 206, it is determined whether a state of the smart TV is normal. When it is determined in Step 205 that the matching unique hardware identification of the device is present, it is then determined whether the state of the smart TV is normal. For example, when the smart TV is an Internet access prohibited state or in a downtime period, it means that smart TV is in an abnormal state, and Step 207 is performed. Step 208 is performed when the smart TV is in the normal state.

In Step 207, an authorization failure message is replied to the smart TV. When it is determined in Step 205 that the matching unique hardware identification of the device is unavailable at the local end of the server, or when it is determined in Step 206 that the smart TV is in the abnormal state, the server replies the authorization failure message to the smart TV.

In Step 208, the machine authorization information is replied to the smart TV. When it is determined in Step 206 that the smart TV is in the normal state, the server replies the machine authorization information to the smart TV. The machine authorization information comprises the authorization number and the MD5 abstract, and is encrypted by AES encryption and replied in an HTTP corresponding body, for example. The MD5 abstract ensures that the authorization number in the machine authorization information is designated to the smart TV.

FIG. 3 shows a flowchart of an authorization method at a server end after the server receives a client certificate request message transmitted from a smart TV according to one embodiment.

In Step 301, the server receives the client certificate request message transmitted from the smart TV.

In Step 302, the client certificate request message is parsed. After receiving the client certificate request message transmitted from the smart TV, the server first parses data carried in the client certificate request message to obtain data such as the unique identification of the application, the machine model number and feature information of the device, and the signature. The data is then verified. More specifically, it is determined whether the parsed data are correct, whether the signature is the same as that submitted by the smart TV when requesting for the machine authorization, and whether the application exists according to the unique identification of the application, etc. Step 303 is performed when the data is successfully verified.

In Step 303, it is determined whether to allow the smart TV to execute the application. When the data obtained from parsing the client certification request message passes the verification, the server determines whether to allow the smart TV to execute the application. Step 305 is performed when the smart TV is allowed to execute the application; otherwise Step 304 is performed.

In Step 304, error information is replied to the smart TV. When it is determined in Step 303 that the smart TV is not allowed to execute the application, the server replies error information to the smart TV.

In Step 305, it is determined whether the application is free of charge. When it is determined in Step 303 that the smart TV is allowed to execute the application, the server determines whether the application is free of charge. Step 308 is performed when the application is free of charge; otherwise Step 306 is performed when the application is a paid application.

In Step 306, it is determined whether the application is previously purchased by the smart TV. When it is determined that the application is a paid application, the server determines whether the application is previously purchased by the smart TV. When the application is previously purchased by the smart TV and the total number of smart TVs issued with the client certificate exceeds a restriction number, Step 308 is performed. When the application is previously purchased by the smart TV but the total number of smart TVs issued with the client certificate exceeds the restriction number, the request is considered as illegal, and the server declines the request for issuing the client certificate and replies the error information to the smart TV. For example, when the application is previously purchased once by a client, the client certificate is already issued to five different smart TVs, and the restriction number set by the system is five. When an issue target of the request is not one of the five smart TVs, the request is considered as illegal, the request for issuing the client certificate is declined and the error information is replied to the smart TV. When the application is not purchased, i.e., the application has never been purchased before or is expired, Step 307 is performed.

In Step 307, a purchase prompt of the application is replied to the smart TV. When the application is not purchased by the smart TV, the server replies a serial transaction number and a paying address to the smart TV. The smart TV then prompts the client whether to make the purchase. The process ends when the client does not make the purchase. Alternatively, when the client chooses to make the purchase, a browser for visiting the paying address is automatically activated, and information including the serial transaction number and the purchased application number is submitted. After submitting the above information, the client selects a paying method and a paying channel to submit the payment. The process automatically ends if the browser is closed by the client or the payment procedure is discontinued before the payment is complete, or the process ends once an error message is prompted when a payment failure occurs. When the payment is successfully submitted, a payment complete message is prompted, and the client may then reactivate the application. After reactivating the application, the smart TV again transmits the client certificate request message to the server.

In Step 308, the client certificate corresponding to the application is replied to the smart TV. When it is determined that the application is free or is purchased, the server replies the client certificate corresponding to the application to the smart TV.

The client certificate records associated information authorized to the current smart TV by the current application. For example, the client certificate is in a Version 3 of an X.509 certificate structure, and is additionally provided with an extension for self-defined properties to complete functions associated with authorization of the application.

A complete certificate structure includes:

1) certification version: as a self-defined extension is needed, the Version 3 of the X.509 certificate structure is utilized;

2) serial number: each certificate has a serial number;

3) signature algorithm identifier: the signature algorithm identifier identifies the algorithm for signing the certificate, and is generally implemented by the RSA encryption algorithm;

4) issuer: the issuer states the name of the entity issuing the certificate validity;

5) validity: the validity specifies the effective date and the expiration date of the certificate;

6) subject: the subject is the entity name for identifying the public key, is unique on the Internet as adopting the X.500 specifications, and is a distinguished name (DN) of the entity. For example, CN=Java Duke; OU=Java Software Division; O=Sun Microsystems Inc.; C=US (i.e., the public known name, the organization unit, the organization and the country);

7) subject public key information: the subject public key information is a public key of the named subject, and at the same time comprises the algorithm identifier and all related key parameters designated by the public key system of the key;

8) certificate signature information: the certificate signature information is the signature approving the contents of the certificate. The certificate signature information is an encrypted string obtained by encrypting the MD5 abstract value of the certificate contents with the private key of the RSA algorithm. The key pair of the RSA encryption algorithm is implemented by the key pair of the current widget server, and is not recorded in the file (confidential); and 9) self-defined extension: the self-defined extension is the most crucial service related information in the certificate, and comprises the self-defined properties of:

a) number of the application with ownership to the certificate: the number of the application with ownership to the certificate indicates the application corresponding to the certificate;

b) authorization number of the television with ownership of the certificate: the authorization number of the television with ownership of the certificate indicates that the certificate is issued to only this particular television;

c) client number with ownership to the certificate: the authorization number of the television with ownership of the certificate is for filling in client accounts under circumstances that one television corresponds to multiple accounts;

d) terminal manufacturer number: the terminal manufacturer number indicates that the certificate is only issued to terminals of the manufacturer, wherein the manufacturers are not restricted if left blank, and manufacturers are spaced by a dash;

e) feature code of the model number with ownership to the certificate: the feature code of the model number with ownership to the certificate indicates that the certificate is only issued to the television with this particular feature code of the model number;

f) authorization type of the purchased application: 0 represents free, 1 represents charging by the number of times of usage, and 2 represents charging by a particular period;

g) validity effective date: the validity effective date starts from the purchase time; and h) validity expiration date: the validity expiration date is the expiration date when the application is free, the number of times allowed to be executed when the application is charged by the number of times of usage, and is the expiration date when the application is charged by a particular period.

Further, since the authorization method of the embodiment can only be carried out online, the authorization cannot be completed if a client does not connect the smart TV to the Internet after purchasing the smart TV. Therefore, the authorization method further provides an offline predetermined certificate mode, which is as described below.

More specifically, under the offline predetermined certificate mode, the server transmits an acknowledged built-in certificate to all smart TVs of a same model number in a centralized manner. For all the smart TVs of the same model, the machine authorization is the same and the client certificates of all built-in applications are the same. In the certificates, instead of also specifying particular smart TVs, only designated smart TV model numbers of designated manufacturers are specified. Thus, under circumstances that the client does not connect to the Internet, the built-in applications that do not Internet access can be executed. When the client connects to the Internet, the acknowledged built-in certificates are automatically transmitted to the server to be updated as official client certificates. In one embodiment, when the application is to be activated, it is determined whether the machine authorization information and the client certificate corresponding to the application are stored at the local end.

When the machine authorization information and the client certificate are available at the local end and the client certificate is valid, the application can then be activated. The machine authorization and the application authorization are integrated—only when the machine authorization designates a unique authorization number to each smart TV, the application authorization is then allowed to control whether the desired service can be performed on the machine according to the unique authorization number. Thus, the control on the application is performed via issuing the certificate at the service end, so as to flexibly define authorized services of applications through control logics at the service end. For example, the client certificate of the application can control at which manufacturers, which smart TVs of the manufacturers, and the number of times or the period the application can be executed. Therefore, the above approach flexibly controls the machine authorization of different smart TVs and the application authorization in the smart TVs for easy management as well as preventing the above issue of a cured authorization document that cannot be modified and can be easily illegally acquired.

Figure 4:
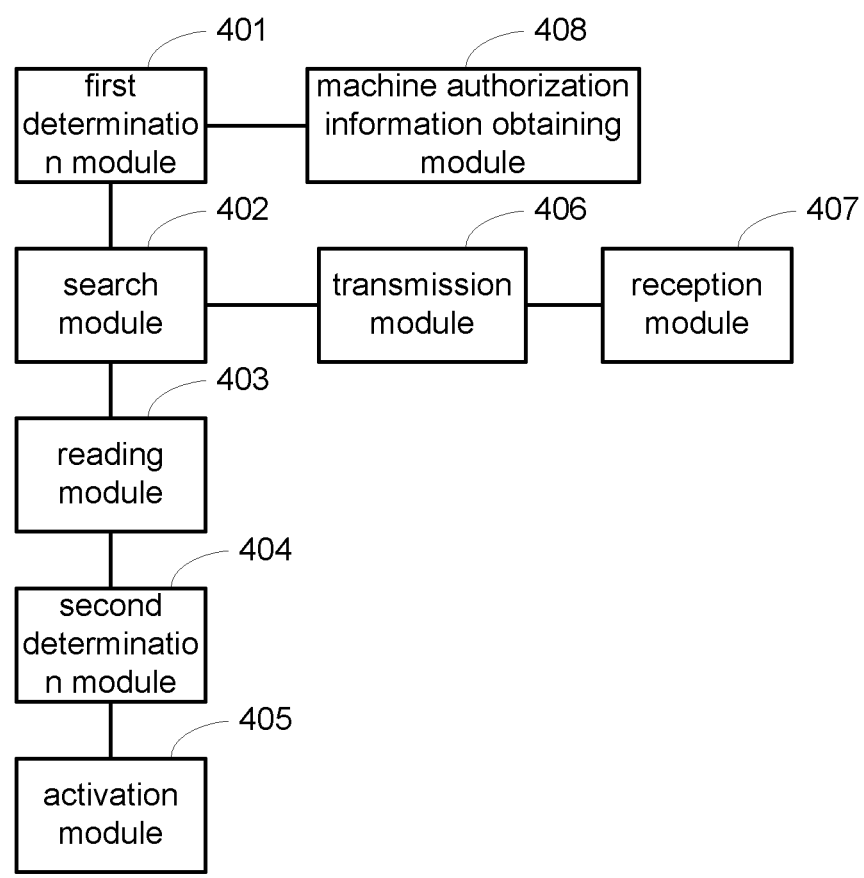
FIG. 4 is a block diagram of a smart TV according to one embodiment of the disclosure.

FIG. 4 shows a smart TV according to one embodiment of the disclosure. The smart TV according to one embodiment includes: a first determination module 401, for determining whether machine authorization information is stored at a local end of the smart TV when an application is to be activated; a search module 402, for searching for a client certificate corresponding to the application when the machine authorization information is stored at the local end, wherein the client certificate includes a validity expiration date; a reading module 403, for reading the client certificate when the client certificate is found; a second determination module 404, for determining whether the client certificate is valid according to the validity expiration date in the client certificate; an activation module 405, for activating the application corresponding to the client certificate when the client certificate is valid.

The smart TV according to one embodiment further includes: a transmission module 406 and a reception module 407. The transmission module 406 transmits a client certificate request message to a server when the client certificate corresponding to the application is not found, wherein the client certificate request message includes data such as an authorization number authorized by machine authorization of the device, a unique identification of the application, and machine module number and feature information of the device. The transmission module 406 further signs the above data. The reception module 407 receives and stores the client certificate when the server replies the client certificate in response to the client certificate request message.

The smart TV according to one embodiment further includes: a machine authorization information obtaining module 408. When the first determination module 401 determines that the machine authorization information is not stored at the local end, the machine authorization information obtaining module 408 obtains the machine authorization information from the server, wherein the machine authorization information is stored in a non-volatile memory.

The machine authorization information obtaining module 408 includes a transmission unit and a reception unit. The transmission unit transmits the machine authorization request message to the server. The machine authorization request message includes a unique hardware identification of a device, manufacturer information of the device, a machine module number and feature information of the device, and a machine code generated by a predetermined encryption algorithm. The reception unit receives the machine authorization information replied from the server in response to the unique hardware identification of the device and the manufacturer information of the device. The machine authorization information comprises an authorization number and an MD5 abstract, is encrypted by AES encryption and is replied in an HTTP corresponding body, for example. The MD5 abstract ensures that the authorization number in the machine authorization information is designated to the smart TV.

In this embodiment, the machine authorization serves a centralized switch, and the application authorization is established on the foundation of the machine authorization to perform different authorization processes on the smart TV.

Thus, the machine authorization and the application authorization are integrated to form a standardized authorization system, so as to flexibly manage the machine authorization and the application authorization in the smart TV and to solve the issue of a cured authorization file that cannot be modified and can be easily illegally acquired as in the current authorization mechanism.

Figure 5:
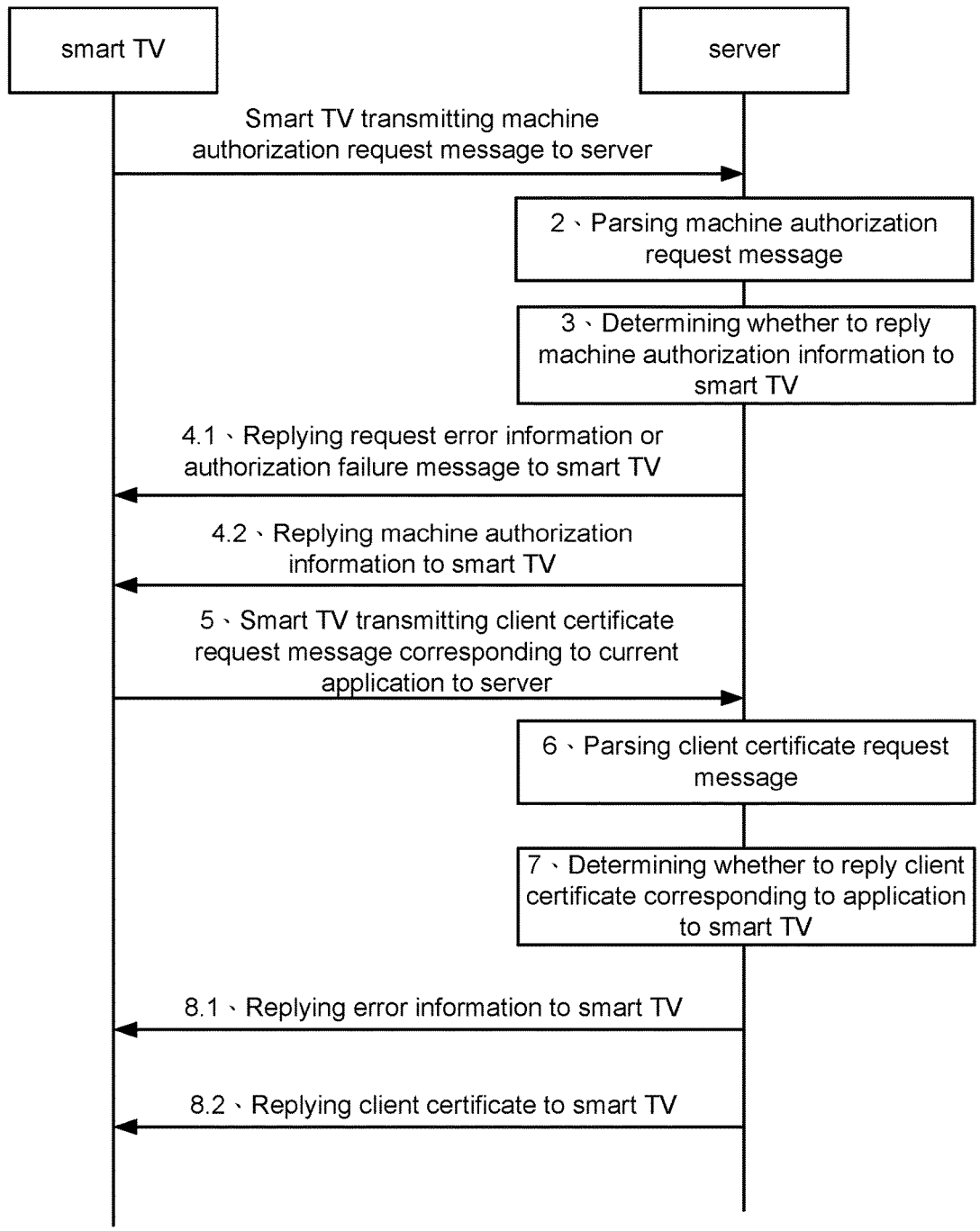
FIG. 5 is a schematic diagram of an authorization system for a smart TV one embodiment of the disclosure.

FIG. 5 shows an authorization system for a smart TV according to one embodiment of the disclosure. The smart TV according to one embodiment includes a smart TV and a server. At the server end, a unique hardware identification table for each smart TV is provided by respective manufacturers of the smart TVs. For example, a MAC address table is provided. The unique hardware identification table is then stored in a database of the server. The manufacture and the unique hardware identification table have a corresponding relationship, and the unique hardware identifications in the unique hardware identification table provided by respective cannot be repetitive. After storing the unique hardware identification table, the unique hardware identifications in the unique hardware identification table are then authorized in batch. More specifically, data is sequentially generated to form an authorization information table according to the unique hardware identifications, and yet the data are in an inactivated state.

The above process is a pre-authorization process in machine authorization, whereas the actual authorization can only be activated when the smart TV applies for authorization from the server. In the description below, details of an example of machine authorization and related service authorization to a smart TV newly purchased by a client are given.

In Step 1, the smart TV transmits a machine authorization request message to the server. When an application is to be activated, it is necessary to apply for machine authorization from the server if the machine authorization information is not stored in a designated address at a local end of the smart TV. For example, the authorization request information includes a unique hardware identification of a device of the smart TV, manufacturer information of the device, a machine module number and feature information of the device, and a machine code generated according to a predetermined encryption algorithm. The above data is submitted according to an AES encryption process to the server via a POST request of HTTP. In the POST request message body, a self-defined request header stores information including signature information, timestamp information, AES key seeds and protocol version number of the request message body.

In Step 2, the server parses the machine authorization request message. After the server receives the machine authorization request message transmitted from the smart TV, the server defines a seed of an AES key carried in a header according to the header of the machine authorization request message, restores the AES encryption key according to algorithms regulated by the protocol version number, and decrypts and signs the data. The decrypted data includes the unique hardware identification of the device, the manufacturer information of the device, and the machine model number and feature information of the device.

In Step 3, it is determined whether the machine authorization information is to be replied to the smart TV. After parsing the machine authorization request message, the server determines whether to reply the machine authorization information according to the data obtained from parsing. More specifically, the server first determines whether the request of the smart TV is legal, and determines whether the same unique hardware identification of the device is stored at the local end. That is, a corresponding hardware identification table is provided according to the manufacturer information of the device. The hardware identification table records all the unique hardware identifications of the devices of smart TVs provided by the manufacturer. According to the unique hardware identification of the device parsed from the machine authorization request message, it is determined whether the same unique hardware identification of the device can be identified from the hardware identification table. When the same unique hardware identification of the device is found, it is then determined whether a state of the smart TV is normal. Step 4.2 is performed when the state of the smart TV is normal. When it is determined that the request of the smart TV is illegal, Step 4.1 is performed to reply request error information to the smart TV. When it is determined that the same unique hardware identification of the device is not found at the local end of the server, it means that the unique hardware identification of the device of the smart TV is fraudulent, and the manufacturer does not manufacture the smart TV corresponding to the fraudulent unique hardware identification of the device, Step 4.1 is performed to reply an authorization failure message to the smart TV. When it is determined that the state of the smart TV is abnormal, e.g., the smart TV is an Internet access prohibited state or in a downtime period, it means that smart TV is in an abnormal state, Step 4.1 is performed to reply the authorization failure message to the smart TV.

In Step 4.1, the request error information or the authorization failure message is replied to the smart TV.

In Step 4.2, the machine authorization information is replied to the smart TV. When the server determines that the machine authorization information can be replied to the smart TV, the server replies the machine authorization information replied to the smart TV. The machine authorization information comprises an authorization number and an MD5 abstract, and is encrypted by AES encryption and replied in an HTTP corresponding body, for example. The MD5 abstract ensures that the authorization number in the machine authorization information is designated to the smart TV.

In Step 5, the smart TV transmits a client certificate request message corresponding to the current application to the server. After the smart TV receives an HTTP response, the smart TV performs different processes according to different information received. When the authorization failure message is replied from the server, previously obtained machine authorization information is cleared if the smart TV is authorized but in an abnormal state such as a downtime state, or else an unauthorized prompt is returned to the client if the smart TV is unauthorized. When the machine authorization information is replied from the server, the machine authorization information and an MD5 abstract key are decrypted according to a key of the current request, contents of the machine authorization information are analyzed, and an authorization number carried in the machine authorization information is recorded to the local end. After completing the machine authorization, the application also needs to be authorized. The smart TV first transmits a client certification request message corresponding to the current application to the server. More specifically, a client certificate request message is transmitted to the server according to a POST method of the HTTP protocols. The client certificate request message includes data such as an authorization number of the device issued by the machine authorization, a unique identification of the application, and a machine model number and feature information of the device, and the above data is then signed.

In Step 6, the server parses the client certificate request message. After receiving the client certificate request message transmitted from the smart TV, the server first parses the data carried in the client certificate request message, such as the unique identification of the application, the machine model number and feature information of the device, and the signature. The data is then verified. More specifically, it is determined whether parsed parameters are correct, whether the signature is the same as the signature submitted by the smart TV when requesting for the machine authorization, and whether the application exists according to the unique identification of the application. Error information is directly replied when the verification fails, or else Step 7 is performed when the verification is successful.

In Step 7, it is determined whether to reply the client certificate corresponding to the application to the smart TV. When the data obtained from parsing the client certification request message passes the verification, it is first determined whether to allow the smart TV to execute the application and then determined whether the application is free of charge. When the application is free of charge, or when the application is a paid application that is previously purchased and a total number of smart TVs issued with the client certificate is not exceeded, Step 8.2 is performed. When it is determined that the smart TV is not allowed to execute the application, Step 8.1 is performed. When it is determined that the application is not free and has not been purchased before, a purchase prompt of the application is presented to a client for making a purchase. More specifically, a serial transaction number and a paying address are replied to the smart TV, which then prompts the client whether to make the purchase. The process ends when the client does not make the purchase. Alternatively, when the client chooses to make the purchase, a browser for visiting the paying address is automatically activated, and information including the serial transaction number and the purchased application number is submitted. After submitting the above information, the client selects a paying method and a paying channel to submit the payment. The process automatically ends if the browser is closed by the client and the payment procedure is discontinued before the payment is complete, or the process ends once an error message is prompted when a payment failure occurs. When the payment is successfully submitted, a payment complete prompt is displayed, and the client may then reactivate the application. After reactivating the application, the smart TV again transmits the client certificate request message to the server. When it is determined that the application is a paid application, it is determined whether the application is previously purchased by the smart TV. When it is determined that the application not free and is previously purchased by the smart TV but the total number of smart TVs issued with the client certificate exceeds a restriction number, the request is considered as illegal, and the request for issuing the client certificate is declined and the error information is replied. For example, the application is previously purchased once by a client, the client certificate is issued to five different smart TVs, and the restriction number set by the system is five. When an issue target of the request is not one of the five smart TVs, the request is considered as illegal, and the request for issuing the client certificate is declined and the error information is replied.

In Step 8.1, the error information is replied to the smart TV.

In Step 8.2, the client certificate is replied to the smart TV. When it is determined that the client certification corresponding to the application can be replied to the smart TV, the client certificate is replied to the smart TV. The client certificate records associated information authorized to the current smart TV by the current application. The client certificate is in a Version 3 of the X.509 certificate structure, and is additionally provided with an extension for self-defined properties to complete functions associated with authorization of the application. Details of the certificate structure are as described in the descriptions associated with the embodiment of application authorization for the smart TV, and shall be omitted herein.

In conclusion, in the disclosure, the machine authorization serves a centralized switch, and the application authorization is established on the foundation of the machine authorization to perform different authorization processes on the smart TV. Thus, the machine authorization and the application authorization are integrated to form a standardized authorization system, so as to flexibly manage the machine authorization and the application authorization in the smart TV and to solve the issue of a cured authorization file that cannot be modified and can be easily illegally acquired as in the current authorization mechanism.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An authorization system for a smart TV, comprising: a smart TV and a server;
wherein, the smart TV:
  determines whether machine authorization information is stored at a designated address in the smart TV when an application is to be activated;
  searches for a client certification corresponding to the application when the machine authorization information is stored, wherein the client certificate comprises a validity expiration date;
  reads the client certificate when the client certificate is found;
  determines whether the client certificate is valid according to the validity expiration date, and activates the application when the client certificate is valid;
  transmits a client certificate request message to a server when the client certificate is not found, wherein the client certificate request message comprises a unique hardware identification of the smart TV and manufacturer information of the smart TV;
  receives the client certificate replied from the server in response to the client certificate request message; and
  transmits a client certificate request message to the server when the client certificate corresponding to the application is not found, receives and stores the client certificate when the server replies the client certificate in response to the client certificate request message;
wherein, the server:
  receives the machine authorization request message transmitted from the smart TV;
  determines whether the unique hardware identification of the smart TV exists in a hardware identification database corresponding to the manufacturer information of the smart TV according to the unique hardware identification of the smart TV and the manufacturer information of the smart TV;
  transmits the machine authorization information to the smart TV when the unique hardware identification of the smart TV exists;
  transmits an authorization failure message to the smart TV when the unique hardware identification of the smart TV does not exist; and
  receives the client certificate request message, determines whether to allow the smart TV to execute the application according to the machine authorization request message carried in the received client certificate request message, determines whether the application corresponding to the certificate is free according to the unique identification of the application, determines whether an identification same as the identification of the smart TV carried in the machine authorization request message is stored in the server when the application is not free, transmits the client certificate to the smart TV when application is free or when the identification same as the identification of the smart TV carried in the machine authorization request message is stored in the server, and transmits error information to the smart TV when the smart TV is not allow to execute the application; and
wherein, said machine authorization information comprises an authorization number and is encrypted, and the client certificate request message comprises the machine authorization request message of the smart TV, said authorization number, and a unique identification of the application, and the machine authorization request message comprises an identification of the smart TV.

2. The authorization system according to claim 1, wherein:
the server further transmits an application purchase prompt to the smart TV when it is determined the application is not purchased by the smart TV; and
the smart TV further receives purchase confirmation information entered by a client after receiving the application purchase prompt, and again transmits the client certificate request message to the server after a making a successful payment.

* * * * *